United States Patent
Clements et al.

(10) Patent No.: US 6,375,698 B1
(45) Date of Patent: Apr. 23, 2002

(54) LONG FILTER ASSEMBLY WITH CONNECTION DEVICE

(75) Inventors: Jack Thomas Clements, Lee's Summit, MO (US); Ronald Lawayne Mahoney, Olathe, KS (US); Jon Baker, Parkville, MO (US)

(73) Assignee: BHA Group Holdings, Inc., Kansas City, MO (US)

(*) Notice: Subject to any disclaimer, the term of this patent is extended or adjusted under 35 U.S.C. 154(b) by 0 days.

(21) Appl. No.: 09/593,351

(22) Filed: Jun. 14, 2000

Related U.S. Application Data

(63) Continuation-in-part of application No. 09/163,654, filed on Sep. 30, 1998, now Pat. No. 6,203,591.

(51) Int. Cl.$^7$ .......................... B01D 29/15; B01D 29/52
(52) U.S. Cl. .......................... 55/341.1; 55/482; 55/484; 55/492; 55/498; 55/505; 55/508
(58) Field of Search ................ 55/341.1, 374, 55/376, 378, 482, 484, 492, 498, 485, 505, 507, 510, 521

(56) References Cited

U.S. PATENT DOCUMENTS

| | | |
|---|---|---|
| 3,716,971 A | 2/1973 | Reinauer |
| 3,877,899 A | 4/1975 | Bundy et al. |
| 4,105,562 A | 8/1978 | Kaplan et al. |
| 4,228,012 A | 10/1980 | Pall |
| 4,422,790 A | 12/1983 | Gebert et al. |
| 4,443,237 A | 4/1984 | Ulvestad |
| 4,445,914 A | 5/1984 | Richard |
| 4,445,915 A | 5/1984 | Robinson |
| 4,559,138 A | 12/1985 | Harms, II |
| 4,609,465 A | 9/1986 | Miller |
| 4,624,785 A | 11/1986 | Drori |
| 4,728,423 A | 3/1988 | Kuwajima |
| 5,141,637 A | 8/1992 | Reed et al. |
| 5,290,330 A | 3/1994 | Tepper et al. |
| 5,435,915 A | 7/1995 | Connors, Jr. |
| 5,607,585 A | 3/1997 | Hobrecht et al. |
| 5,746,792 A | 5/1998 | Clements et al. |
| 6,093,226 A * | 7/2000 | Schoenberger ............... 55/310 |

OTHER PUBLICATIONS

J. Air Waste Manag. Assoc., Sep. 1992, pp. 1240–1249 The Potential of Pulse–Jet Baghouses for Utility Boilers. Part 2: Performance of Pulse–Jet Fabric Filter Pilot Plants.

J. Air Waste Manag. Assoc., Feb. 1992, pp. 209–217 The Potential of Pulse–Jet Baghouses for Utility Boilers. Part 1: A Worldwide Survey of Users.

* cited by examiner

Primary Examiner—Robert A. Hopkins
(74) Attorney, Agent, or Firm—Shook Hardy & Bacon

(57) ABSTRACT

A filter assembly (24) includes a first filter portion (80) with a first attachment (100) adapted to attach to a tubesheet (44) to support at least a portion of the first filter portion in a second plenum (40) and to permit fluid communication between the first filter portion and a first plenum (42). A tubular member (104) is fixed to and extends from the first attachment (100). A pleated filter element (120) is disposed adjacent to the tubular member (104) for support. A second attachment (140) is fixed to the tubular member (104) at a second end of the first filter portion (80) and defines an opening through which fluid may flow. The tubular member (104) is fixed to the first and second attachments (100, 140) with sufficient strength to support the weight of at least one other filter portion. A second filter portion (82) includes a third attachment (180) at a first end and defines an opening through which fluid may flow. A tubular member (186) is fixed to and extends from the third attachment (180). A pleated filter element (188) is disposed adjacent to the tubular member (186) for support. A plate (190) closes a second end of the second filter portion (82). A connection device (510, 522) sealingly connects the second attachment (140) of the first filter portion (80) with the third attachment (180) of the second filter portion (82) and permits fluid communication between the first and second filter portions. The connection device (510,522) has sufficient strength to support the weight of filter portions located on the side of the clamping mechanism opposite the first attachment (100) of the first filter portion (80).

11 Claims, 6 Drawing Sheets

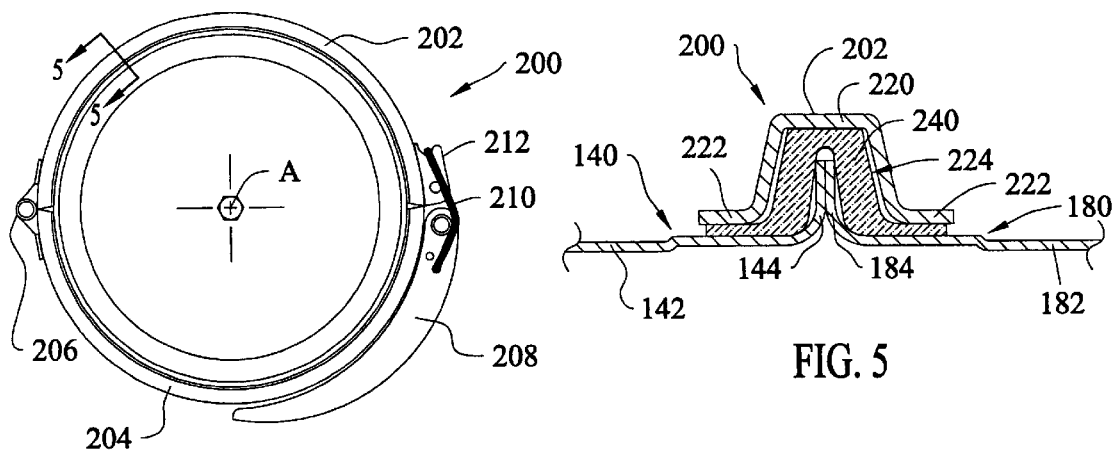
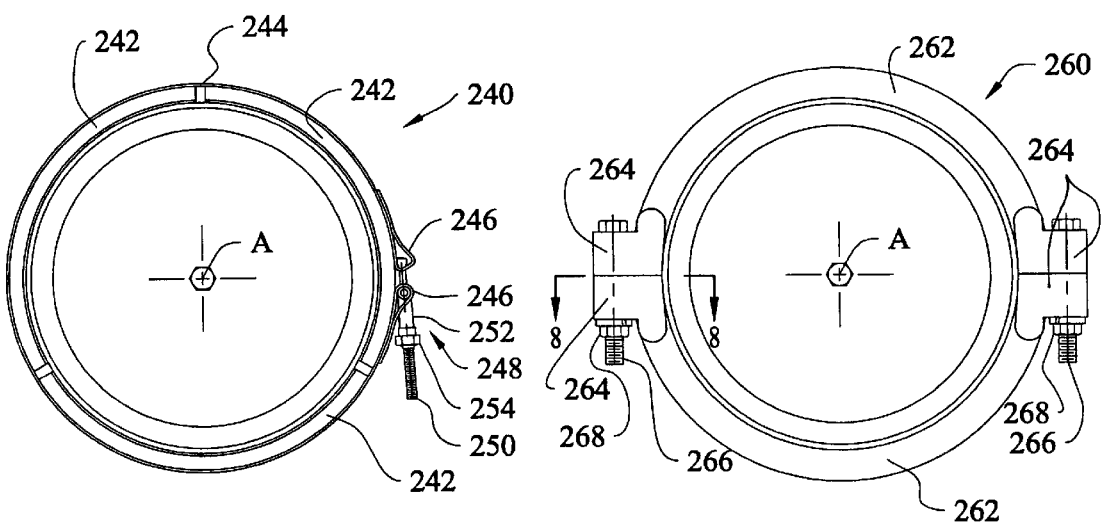
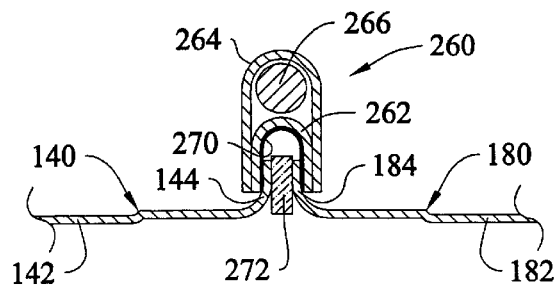

LONG FILTER ASSEMBLY WITH CONNECTION DEVICE

CROSS-REFERENCE TO RELATED APPLICATIONS

The present application is a continuation-in-part of Ser. No. 09/,163,654 filed on Sep. 30, 1998, now U.S. Pat. No. 6,203,591.

BACKGROUND OF THE INVENTION

1. Technical Field

The present invention relates generally to a baghouse, a filter assembly for use in the baghouse and a method of installing the filter assembly in the baghouse. In particular, the present invention relates to a relatively long multi-piece filter assembly having pleated filter elements.

2. Description of the Prior Art

Continuous emphasis on environmental quality results in ever-increasing regulatory control on pollutants and emissions throughout the world. Much of the regulatory control is focused on reducing pollutants and emissions from certain industrial plants, such as power plants and metal production plants. A known technique to control pollutants and emissions from industrial plants is to separate undesirable particulate matter carried in a gas stream by fabric filtration. Such fabric filtration is accomplished in a dust collection apparatus known in the industry as a "baghouse."

The baghouse typically includes a housing divided into two plenums by a tubesheet. One plenum is a "dirty air plenum" which communicates with an inlet and receives "dirty" or particulate laden gas from a source at the plant. The other plenum is a "clean air plenum" which receives cleaned gas after filtration and communicates with an outlet to direct cleaned gas away from the bathhouse. A plurality of relatively long cylindrical fabric filters, commonly called "bags," are suspended from the tubesheet in the dirty air plenum. Each bag is installed over a cage and has a closed lower end. The cage may be in two or more pieces. Each bag is mounted to the tubesheet at its upper end to hang vertically in the dirty air plenum. The upper end portion of the bag is open and the interior of each bag is in fluid communication with the clean air plenum.

In operation, particulate laden gas is conducted into the dirty air plenum. As the particulate laden gas flows through the baghouse, the particulates carried by the as engage the exterior of the fabric filter bags and accumulate on the fabric filter bags or arc separated from the gas stream and fall into an accumulator chamber at the lower portion of the dirty air plenum. Cleaned gas then flows through the fabric filter bags, into the interior of the fabric filter bags, into the clean air plenum and through the outlet. Although many bag, houses are made according to this basic structure, there may be numerous operational and structural differences among baghouses.

There is interest in replacing known fabric filter bags with pleated element filters to increase the effective filtering area while occupying the same space, or less, within the baghouse as the known fabric filter bags. However, certain barriers to easy replacement of fabric filter bags by pleated element filters exist. In some baghouse designs, the fabric filter bags can have a length of about four meters. The clean air plenum often has a clearance height that is substantially less than four meters, for example, about one and a half meters. It is generally not a problem to install fabric filter bags in the baghouse since the fabric filter bags are foldable, flexible and non-rigid. A relatively lone and rigid pleated element filter cannot be installed without considerable manipulation if it can be installed at all, even if the baghouse has a roof with a portion that can be moved to a position which provides access to the clean air plenum. Not all baghouses have such a movable roof.

In order to occupy the same space within the baghouse as a fabric filter bag, the length of the pleated element filter would be relatively long and can be up to about four meters in length or more. This presents a problem for filter manufacturers because there are limits as to the width of the filter media that can be pleated with current production machinery to provide such a long, filter. The current production machinery used to pleat filter media typically cannot accommodate continuous filter media more than about two meters in width. Such a long filter would also be relatively difficult to handle and transport.

If the more efficient pleated element filter is desired, the majority of the filter must be capable of being inserted through an opening in the tubesheet from the clean air plenum. If known, relatively short, pleated element filter structures are used and are axially connected together, more problems can arise. Any structure used to connect known pleated element filter structures together must be strong enough to carry the load of the filter when it has particulates accumulated on it and fit through an opening in the tubesheet. Furthermore, a potting material, such as silicone or polyurethane, is typically used to hold a pleated element in a known filter structure and connect other structure of the filter together. This potting material has limited ability to carry load. The weight of filters supported by the potting material is relatively large and can exceed the potting material's ability to carry sufficient load. For example, if a "clean" filter having a pleated element and a length of about four meters weighs twenty pounds, it is estimated that particulates which accumulate on the pleated element could add 200 to 300 pounds to the weight of the filter structure.

It is, thus, seen that using pleated element filters in baghouses is very desirable. Accordingly, there is a need in the industry for improvements in filter structure and installation techniques.

SUMMARY OF THE INVENTION

The present invention is directed to an industrial baghouse, a relatively long filter assembly for use in the baghouse and a method of installing the filter assembly in the baghouse. The filter assembly of the present invention provides a relatively large filtration area for the space occupied. The filter assembly of the present invention can replace fabric filter bans in existing baghouses or be specified in new baghouses to take advantage of the filter assembly's relatively large filtration area and ease of handling.

The baghouse of the present invention includes a housing that is divided into first and second plenums by a tubesheet. The tubesheet has a substantially planar portion with a plurality of opening is extending through the planar portion. The first plenum has a first dimension taken in a direction normal to the planar portion of the tubesheet. The second plenum has a second dimension taken in a direction normal to the planar portion of the tubesheet. The second dimension is greater than the first dimension.

The baghouse includes a plurality of filter assemblies supported by the tubesheet at their upper ends. Each filter assembly is adapted to hang in a substantially vertical direction. Each filter assembly has a first filter portion with a first attachment at a first open end. The first attachment is adapted to mount the first filter portion to the tubesheet at a location adjacent to an opening in the tubesheet. The first attachment supports at least a portion of the first filter portion in the second plenum and permits fluid communication between the interior of the first filter portion and the first plenum. A tubular member is fixed to and extends from the first attachment. A pleated filter element is disposed adjacent to the tubular member for support. A second attachment is fixed to the tubular member at a second and of the first filter portion. The second attachment defines an opening at the second end of the first filter portion through which fluid may flow. The tubular member is fixed to the first and second attachments with sufficient strength to support the weight of at least one other filter portion.

A second filter portion includes a third attachment at a first end to define an opening through which fluid may flow. A tubular member is fixed to and extends from the third attachment. A pleated filter element is disposed adjacent to the tubular member for support. A plate is located at a second end of the second filter portion and defines a closed end of the second filter portion.

A connection device sealingly connects the second attachment of the first filter portion to the third attachment of the second filter portion to enable fluid communication between the first and second filter portions. The connection device has a strength sufficient to support the weight of filter portions located on a side of the connection device opposite the first attachment of the first filter portion.

The filter assembly has a length greater than the first dimension of the first plenum. At least one of the first and second filter portions has a length in the range of one meter to three meters. The first filter portion also includes a portion adapted to extend through a respective opening in the tubesheet when the filter assembly is mounted to the tubesheet. The tubular member in at least one filter portion is welded, riveted or fastened to at least one of the attachments.

The connection device has a size capable of fitting through the opening in the tubesheet. The connection device comprises a clamping mechanism. The clamping mechanism includes portions movable between an unclamped position and a clamped position in a plane extending substantially normal to a longitudinal central axis of the filter assembly. A gasket is locatable between a surface of the clamping mechanism and at least one of the second attachment of the first filter portion and the third attachment of the second filter portion. The connection device may comprise a threaded connection. A compressible gasket is locatable between the second attachment of the first filter portion and the third attachment of the second filter portion to compress as the filter portions are connected together.

An alternative connection device has a connection tube extending from a collar formed on the connecting, end of a first filter portion. A groove is formed around the connection tube. The opposing filter portion has a flexible connection sleeve having a tongue corresponding to the groove of the connection tube. When the connection tube is inserted within the flexible connection sleeve, the tongue is seated within the groove. In this position, the rim of the connection sleeve contacts the end of the opposing filter portion and forms an air tight seal therebetween.

The filter assembly may include a third filter portion with attachments at opposite open ends fixed to a tubular member supporting a pleated filter element. The tubular member is fixed to the attachments with a strength sufficient to support the weight of at least one other filter portion. The third filter portion is adapted to be located between and connected to the first and second filter portions by a pair of connection devices. Each connection device sealingly connects an attachment of one filter portion with an attachment of an axially adjacent filter portion to enable fluid communication between the connected filter portions. Each connection device has a size capable of fitting through the opening in the tubesheet and a strength to support the weight of at least one other filter portion located on a side of the connection device opposite the first attachment of the first filter portion.

The method of the present invention is directed to installing a relatively long filter assembly in a baghouse. The baghouse is divided into first and second plenums by a substantially planar tubesheet. A plurality of openings extend through the tubesheet. The first plenum has a first dimension taken normal to the tubesheet. The second plenum has a second dimension taken normal to the tubesheet. The second dimension is greater than the first dimension. At least one filter assembly is adapted to be supported mostly in the second plenum and hangs in a substantially vertical direction.

The method includes the steps of providing a first filter portion with a first attachment at a first end. A tubular member is fixed to and extends from the first attachment. A pleated filter element is disposed about the tubular member for support. A second attachment is fixed to and extends from the tubular member at a second open end of the first filter portion through which fluid may flow.

The method also includes the step of providing a second filter portion with a third attachment at a first open end of the second filter portion through which fluid may flow. A tubular member extends from the third attachment. A pleated filter element is disposed about the tubular member for support. A plate is located at a second end of the second filter portion to define a closed end of the filter assembly.

The method further includes connecting the second attachment of the first filter portion to the third attachment of the second filter portion with a connection device. The connection device is constructed to have sufficient strength to support the operational weight of filter portions located on a side of the connection device opposite the first attachment of the first filter portion. The filter assembly and connection device may then be moved through the opening in the tubesheet.

The connecting together step further includes the step of providing a filter assembly having a length greater than the first dimension of the first plenum when the first and second filter portions are connected together. The method also includes the step of mounting the first attachment of the first filter portion to the tubesheet of the baghouse to support the filter assembly. The connecting together step includes moving portions of a clamp in a plane extending normal to the longitudinal central axis of the filter assembly to a clamped position against the second and third attachments. The connecting together step may include threading the third attachment into the second attachment.

BRIEF DESCRIPTION OF THE DRAWINGS

Further features of the present invention will become apparent to those skilled in the art to which the present invention relates from reading the following description with reference to the accompanying drawings, in which:

FIG. 4 is a plan view of a connection device of the filter assembly illustrated in FIG. 2 taken approximately along the line 4—4 in FIG. 2;

FIG. 5 is a sectional view of the connection device and a portion of the filter assembly illustrated in FIG. 4, taken approximately along the line 5—5 in FIG. 4;

FIG. 6 is a view similar to FIG. 4 of an alternate connection device;

FIG. 7 is a view similar to FIG. 4 of an another alternate connection device;

FIG. 8 is a sectional view of the connection device and a portion of the filter assembly illustrated in FIG. 7, taken approximately along the line 8—8 in FIG. 7;

DESCRIPTION OF PREFERRED EMBODIMENTS

Figure 1:
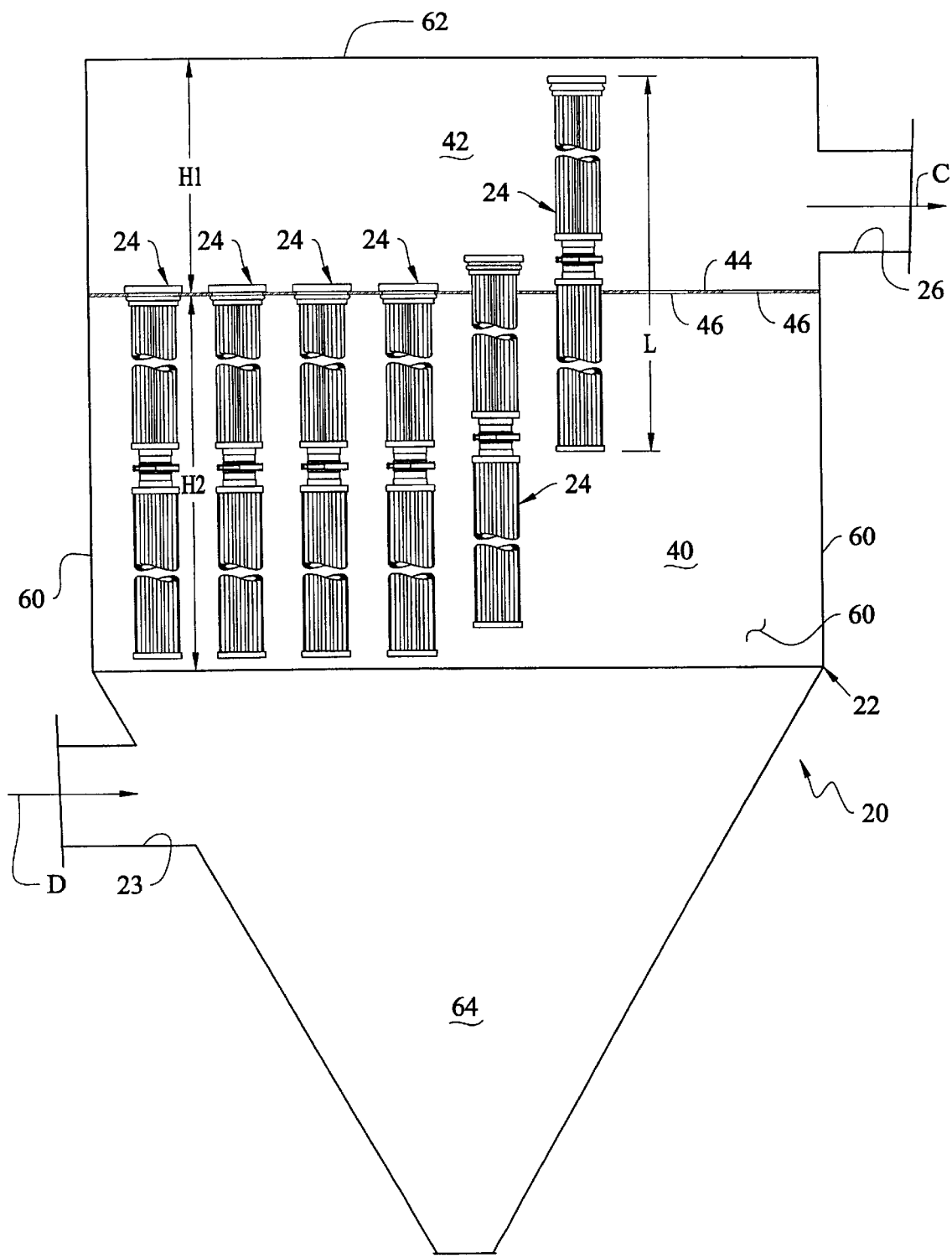
FIG. 1 is a schematic view, partly in section, of a baghouse of the present invention with filter assemblies of the present invention installed.

A baghouse 20 according to the present invention is illustrated in FIG. 1. The baghouse 20 is defined by an enclosed housing 22. The housing 22 is made from a suitable material, Such as sheet metal. A particulate laden gas D flows through the baghouse 20 from an inlet 23. The particulate laden gas D is filtered by a plurality of filter assemblies 24 (FIG. 2) of the present invention located within the baghouse 20. Cleaned gas C exits through an outlet 26 of the baghouse 20.

The baghouse 20 is divided into a "dirty air" plenum 40 and a "clean air" plenum 42 by a tubesheet 44 made from a suitable material, such as sheet metal. The tubesheet 44 has at least a portion that is substantially planar. The inlet 23 is in fluid communication with the dirty air plenum 40. The outlet 26 is in fluid communication with the clean air plenum 42.

A plurality of openings 46 extend through the planar portion of the tubesheet 44. Each opening 46 has an effective diameter D1 (best seen in FIG. 3), defined by the inner surface of the opening or any intervening component, through which a portion of the filter assembly 24 can be moved. The clean air plenum 42 has a minimum dimension or clearance height H1 taken in a direction normal to the tubesheet 44. The dirty air plenum 40 has an access height H2 taken in a direction normal to the tubesheet 44 in which a filter assembly 24 can be installed without engaging the housing, 22 of the baghouse 20. The height H2 of the dirty air plenum 40 is greater than the height H1 of the clean air plenum 42. The height H2 of the dirty air plenum 40 is approximately one and a half to four times the height H1 of the clean air plenum 42.

The housing 22 of the baghouse 20 includes sides 60 and a roof 62. The baghouse 20 is illustrated as having a non-movable roof 62. Thus, access to the clean air plenum 42 and baghouse 20 is limited. It will be apparent to one skilled in the art that the roof 62 can have access panels that are removable or movable to a position that does not inhibit access to the clean air plenum 42. The baghouse 20 also has an accumulation chamber 64 defined by irregular shaped and sloped walls located at a lower end of the dirty air plenum 40. The filter assemblies 24 are illustrated as not extending into the accumulation chamber 64 but it will be apparent that the filter assemblies may extend into the accumulation chamber.

A resilient mounting band 66 is located in the opening 46 in the tubesheet 44. The band 66 is made from metal, such as a stainless steel, and is covered with fabric. The band 66 is constructed with an outer diameter substantially equal to the inner diameter of the opening 46. The band 66 may be easily deformed and inserted into the opening 46. The exterior surface of the band 66 snugly engages the surface defining the opening 46. The band 66 provides a seal between the filter assembly 24 and the opening 46 in the tubesheet 44. The band 66 is described in detail in U.S. Pat. No. 5,746,792, which is assigned to the assignee of the present invention and incorporated herein by reference.

The filter assemblies 24 filter particulates from the particulate laden gas D as the gas passes radially inward through each filter assembly. Each filter assembly 24 is made up of at least an upper filter portion 80 (as viewed in FIGS. 2–3) and a lower filter portion 82. The filter portions 80, 82 are axially aligned in an end-to-end stack and connected together in a fluid-tight relationship. Each filter assembly 24 is supported at its upper end (as viewed in FIGS. 1–3) by the tubesheet 44 and hangs downwardly in a substantially vertical direction. A tubular mounting sleeve 100 is located at the upper end (as viewed in FIGS. 2 and 3) of the filter assembly 24 and bears the entire weight of the filter assembly when the mounting sleeve is attached to the tubesheet 44. The mounting sleeve 100 has an outer diameter D2 (FIG. 3) that is greater than the effective inner diameter D1 of the band 66 and opening 46.

Each filter assembly 24 has a longitudinal central axis A. Each filter assembly 24 has an overall length L taken in a direction parallel to the axis A. The length L of the filter assembly 24 is greater than the clearance height H1 of the clean air plenum 40 and preferably less than the access height H2 of the dirty air plenum 42 at least in the location closest to the inner periphery of the housing 22. The upper filter portion 80 has a length L1 (FIG. 3) taken in a direction parallel to the axis A of the filter assembly 24. The lower filter portion 82 has a length L2 taken in a direction parallel to the axis A of the filter assembly 24. It will be apparent that any number and lengths of filter portions could be utilized that are suitable to the filtering requirements of the baghouse 20.

The length L of the filter assembly 24 can be any desired length that is appropriate for particular filtering requirements. At least one of the upper and lower filter portions 80,82 of the filter assembly 24 has a length in the range of one meter to three meters. Preferably, the length L1 or L2 of the filter portion 80 or 82 is less than the clearance height H1 of the clean air plenum 42. It will also be apparent that the length L1 of the upper filter portion 80 can be different from the length L2 of the lower filter portion 82.

Figure 2:
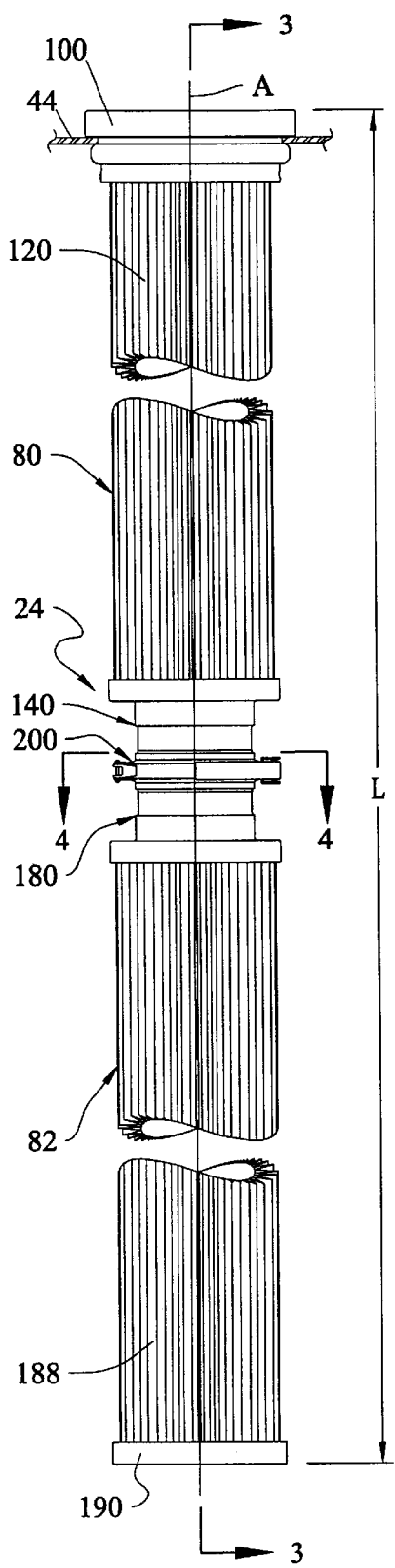
FIG. 2 is an elevational view of a filter assembly, illustrated in FIG. 1, according to one embodiment of the present invention.
Figure 3:
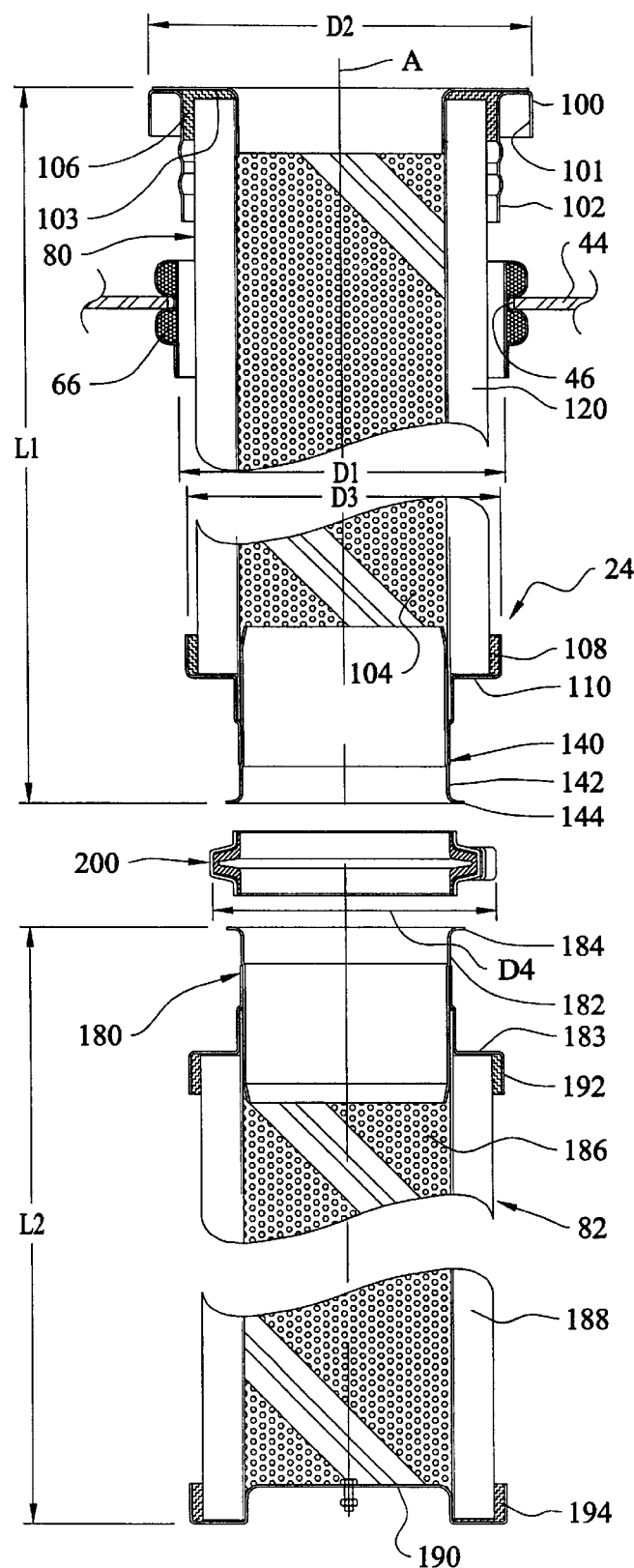
FIG. 3 is an exploded sectional view of the filter assembly illustrated in FIG. 2, taken approximately along the line 3—3 in FIG. 2.

The upper filter portion 80 is open on both ends, as illustrated in FIG. 3. The mounting sleeve 100 is located at an upper end (as viewed in FIGS. 2 and 3) of the upper filter portion 80 to attach the upper filter portion and filter assembly 24 to the tubesheet 44. The mounting sleeve 100 is made from a suitable material. Such as stamped, drawn or otherwise formed metal. The mounting sleeve 100 defines an open end of the upper filter portion 80 for fluid communication with the clean air plenum 42. While the upper filter portion 80 is described as having a circular cross-section, it will be apparent that any suitable configuration cross-section could be used, such as oval or square.

One of the filter assemblies 24 (FIGS. 1–3) extends through a respective opening 46 in the tubesheet 44 and through the band 66. The band 66 ensures that the filter assembly 24 may be used with openings 46 that have not been precisely cut. The mounting sleeve 100 has a channel 101 that receives a part of the band 66.

The upper filter portion 80 further includes a tubular portion 102 of the mounting sleeve 100 that is adapted to be located within and extend through a respective opening 46 in the tubesheet 44 and the band 66. A tube 104 is fixed to and extends from the mounting sleeve 100. The tube 104 is made from a suitable material, such as perforated sheet metal, expanded metal or mesh screen. A radially inner channel 103 in the mounting sleeve 100 receives an upper end of the tube 104. The upper end of the tube 104 and the mounting sleeve 100 sleeve are connected together in a suitable manner, such as by welds, rivets, fasteners or metal deformation. Thus, a relatively strong connection and structure exists that is capable of supporting the weight of the filter assembly 24 as it hangs from the tubesheet 44 even when the filter assembly has a relatively heavy accumulation of particles.

A pleated element 120 is located concentrically around the tube 104. The tube 104 supports the pleated element 120 in a radial direction. The pleated element 120 is formed in a substantially tubular shape about the perimeter of the tube 104 with accordion folds at its inner and outer peripheries. The pleated element 120 may be constructed of any suitable material for a desired filtering requirement. The upper end of the pleated element 120 is also located in the channel 103 of the mounting sleeve 100 and placed in a potting material 106, which acts to seal the pleated element and the mounting sleeve. It will be apparent that the pleated element 120 could be located radially inward of the tube 104.

A collar 140 is fixed to the tube 104 at the lowermost end (as viewed in FIGS. 2–3) of the upper filter portion 80. The collar 140 of the upper filter portion 80 defines an open end of the upper filter portion for fluid to flow through. The collar 140 is made from a suitable material, such as sheet metal. The tube 104 and collar 140 are connected together in a suitable manner, such as by welds, rivets, fasteners or metal deformation. Thus, a relatively strong connection is provided which is capable of supporting the weight of one or more filter portions that may be connected to the upper filter portion 80 even when those filter portions have a heavy accumulation of particulates.

Potting material 108 is located between the exterior of the lower end of the pleated element 120 and a support 110 of the collar 140 to form a seal. The collar 140 includes a tubular portion 142. A flange portion 144 is located at the lower end of the tubular portion 142 (as viewed in FIG. 3) and extends radially outward from the tubular portion. A lower end of the tube 104 is located between portions of the support 110 and the tubular portion 142 of the collar 140.

The lower filter portion 82 includes another collar 180 at its upper end (as viewed in FIG. 3). The collar 180 is preferably identical to the structure and size of the collar 140. The collar 180 defines an open end of the lower filter portion 82 through which fluid may flow to the upper filter portion 80. The collar 180 has tubular portion 182 and a radially extending flange portion 184. The collar 180 is made from a suitable material, such as sheet metal.

A tube 186 is fixed to and extends from the collar 180. The tube 186 is made from a suitable material, such as perforated sheet metal, expanded metal or mesh screen. The tube 186 and second collar 180 are connected together in a suitable manner, such as by welds, rivets, fasteners or metal deformation. Thus, a relatively strong structure is provided with sufficient strength capable of supporting the operational weight of the lower filter portion 82 even when particulates accumulate on the lower filter portion.

A pleated filter element 188 is disposed about and radially supported by the tube 186. A plate 190 is located at the lower end (as viewed in FIG. 3) of the lower filter portion 82 to define a closed end of the lower filter portion and the filter assembly 24. The plate 190 is preferably fixed to the tube 186. Potting material 192, 194 is located between the exterior of the pleated element 188 and a support 183 of the collar 180 and the plate 190, respectively, to form a seal.

While a circular cross-section lower filter portion 82 is described, it will be apparent that any shaped cross section may be used, such as oval or square and which matches the size and cross-section of the upper filter portion 80. It should also be apparent that the potting material 106, 108, 192 and 194 does not carry much, if any, of the load resulting from the operational weight of the filter assembly 24, when particulates accumulate on the filter assembly. Both filter portions 80, 82 have a maximum diameter D3 so they can fit through the opening 46 in the tubesheet 44 and band 66.

The filter assembly 24 also includes a connection device to sealingly connect the upper and lower filter portions 80, 82 together. The connection device has a maximum size that is smaller than the effective size D1 of the opening 46 in the tubesheet 44 and the band 66 when the connection device connects together the filter portions 80, 82. The size D4 of the connection device is preferably smaller than the size of the upper filter portion 80. The connection device, thus, can fit through the opening 46 in the tubesheet 44 and the band 66. The connection device also is constructed to have a strength sufficient to carry the load of the operational weight of at least one filter portion 82 located below the connection device.

One connection device of the present invention preferably comprises a clamp 200 (best seen in FIGS. 4 and 5) made from metal. The clamp 200 includes clamp portions 202, 204 which are movable in a plane extending substantially normal to a longitudinal central axis A of the filter assembly 24 between an unclamped position and a clamped position. Each of the clamp portions 202, 204 spans about 180° of the clamp 200, as viewed in FIG. 4.

Each of the clamp portions 202, 204 has a central portion 220 with generally U-shaped cross-section, as viewed in FIG. 5, with wings 222 extending from opposite sides of the central portion. The clamp 200 includes a hinge 206 and at a diametrally opposite side (as viewed in FIG. 4) is a pivotable lever 208 carrying a latch 210 at an end of clamp portion 204. On an end of the clamp portion 202 is a receiver 212. When the flanges 144, 184 are received in the central portion 220 of the clamp 200, the latch 210 is placed in the receiver 212. The lever 208 is then pivoted against the clamp portion 204 to sealingly connect the filter portions 80, 82 together.

A compressible split gasket 224 (FIG. 5) is located within the clamp portions 202, 204. The gasket 224 gets positioned between a surface of the clamp portions 202, 204 and at least one, but preferably both, of the collar 140 of the upper filter portion 80 and the collar 180 of the lower filter portion 82. The gasket 224 has a generally V-shaped groove in its middle portion 240 to receive the flanges 144, 184 of the collars 140, 180 and form a seal. As the filter portions 80, 82 are connected together, the clamp portions 202, 204 exert a radial force against the gasket 240 to engage and seal against the tubular portions 142, 182 and flange portions 144, 184 of the collars 140, 180. It will be apparent that the gasket 224 may have any suitable size, shape and configuration that meet the sealing and load carrying requirements of the filter assembly. The clamp 200 has a size D4 capable of fitting through the effective size D1 of the opening 46 in the tubesheet 44 and band 66.

A clamp 240 according to an alternate embodiment of the present invention is illustrated in FIG. 6 and performs the same functions as the clamp 200, illustrated in FIGS. 2–5 and described above. The clamp 240 has three sections 242 spot-welded to a band 244. The sections 242 are movable in a plane extending normal to the axis A of the filter assembly 24 between clamped and unclamped positions. The sections 242 of the clamp 240 move from an expanded state to a contracted state to connect and seal the filter portions 80, 82 together.

Ends of the band 244 are formed into a loop 246. The clamp 240 has a tightening mechanism 248 including a single threaded member 250. One end of the threaded member 250 is pivotably received in one loop 246. A support 252 receives the threaded member 250 and has a portion received in the other loop 246. A nut 254 of the clamp 240 is tightened against the support 252 to move the sections 242 towards the axis A and over the flange portions 144, 184 and against the tubular portions 142, 182 of the collars 140, 180. The clamp 240 has a size capable of fitting through the opening 46 in the tubesheet 44 and band 66.

A clamp 260 according to another alternate embodiment is illustrated in FIG. 7. The clamp 260 has a size capable of fitting through the effective size D1 of the opening 46 in the tubesheet 44 and band 66. The clamp 260 includes a pair of halves 262 that are identical and span about 180° of the clamp.

Each clamp half 262 includes a pair of connecting sections 264 on diametrally opposite ends. A threaded fastener 266 extends through an adjacent pair of connecting sections 264. A compressible circular gasket 270 with a U-shaped cross-section is located between the halves 262 of the clamp 260 and the flange portions 144, 184. When a nut 268 is tightened on the threaded fasteners 266, the clamp halves 262 move toward the axis A and the gasket 270 sealingly engages the flanges 144, 184 of the collars 140, 180. Another compressible gasket 272 may be located between the flange portions 144, 184 to provide additional sealing and to act as a cushion between the flange portions.

Figure 9:
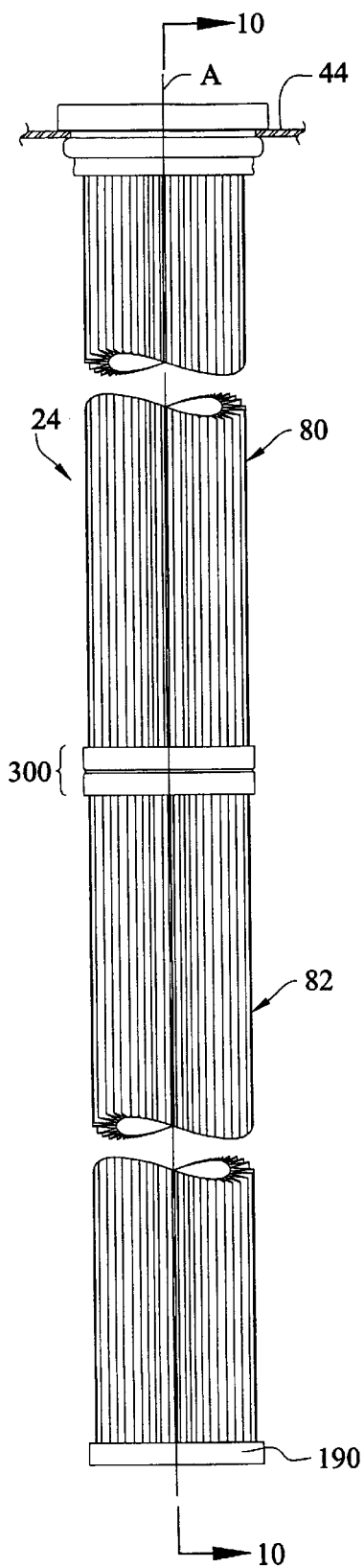
FIG. 9 is a view similar to FIG. 2 of a filter assembly according to an alternate embodiment of the present invention.
Figure 10:
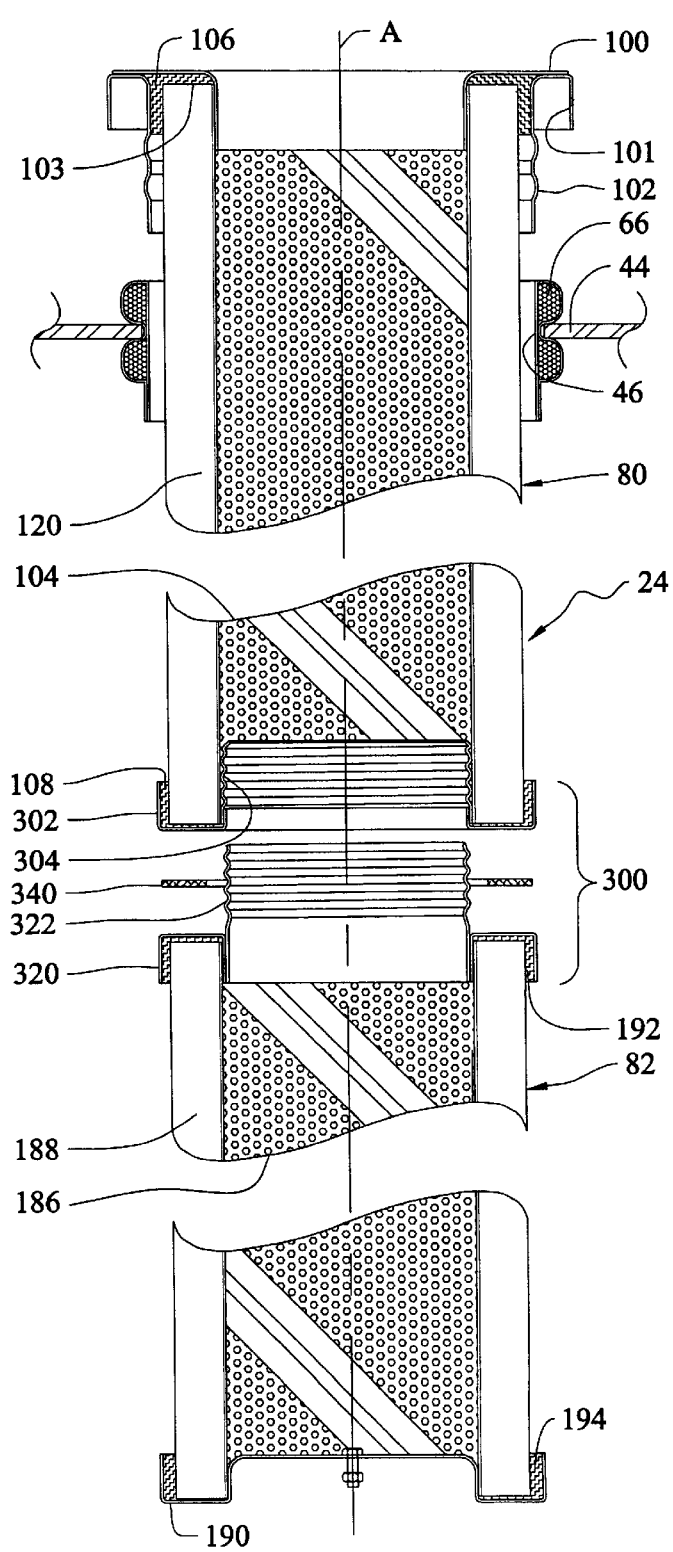
FIG. 10 is an exploded sectional view of the filter assembly illustrated in FIG. 9, taken approximately along the line 10—10 in FIG. 9.

The filter assembly illustrated in FIGS. 9 and 10 includes an alternate connection device in the form of a threaded connection 300. The filter portions 80, 82 of the filter assembly 24 are constructed similar to the filter portions illustrated in FIGS. 1–3 and described above. The threaded connection 300 includes a collar 302 located at the lower end (as viewed in FIG. 10) of the upper filter portion 8. The collar 302 has a receiving internally threaded portion 304. The collar 302 is fixed to the tube 104 of the upper filter portion 80, as viewed in FIG. 10, in a suitable manner such as by welds, rivets, fasteners or metal deformation. The threaded connection 300 also includes a collar 320 located at the upper end of the lower filter portion 82. The collar 320 has an externally threaded tubular portion 322 for threaded engagement with the receiving portion 304. The collar 320 is fixed to the tube 184 of the lower filter portion 82, as viewed in FIG. 10, in a suitable manner such as by welds, rivets, fasteners or metal deformation.

A compressible gasket 340 is located between a lower end surface of the collar 302 of the upper filter portion 80 and an upper end surface of the collar 320 of the lower filter portion 82. The gasket 340 compresses as the filter portions 80, 82 are connected together when one filter portion 80 or 82 is rotated about the axis A relative to the other filter portion 82 or 80 to engage the threaded portions 304, 322 and thread the collar 320 into the collar 302. The connection device 300 has a size capable of fitting through the effective size D1 of the opening 46 in the tubesheet 44 and the band 66. The connection device 300 has a strength sufficient to support the operational weight of filter portions located below the connection device, as viewed in FIG. 10.

Figure 11:
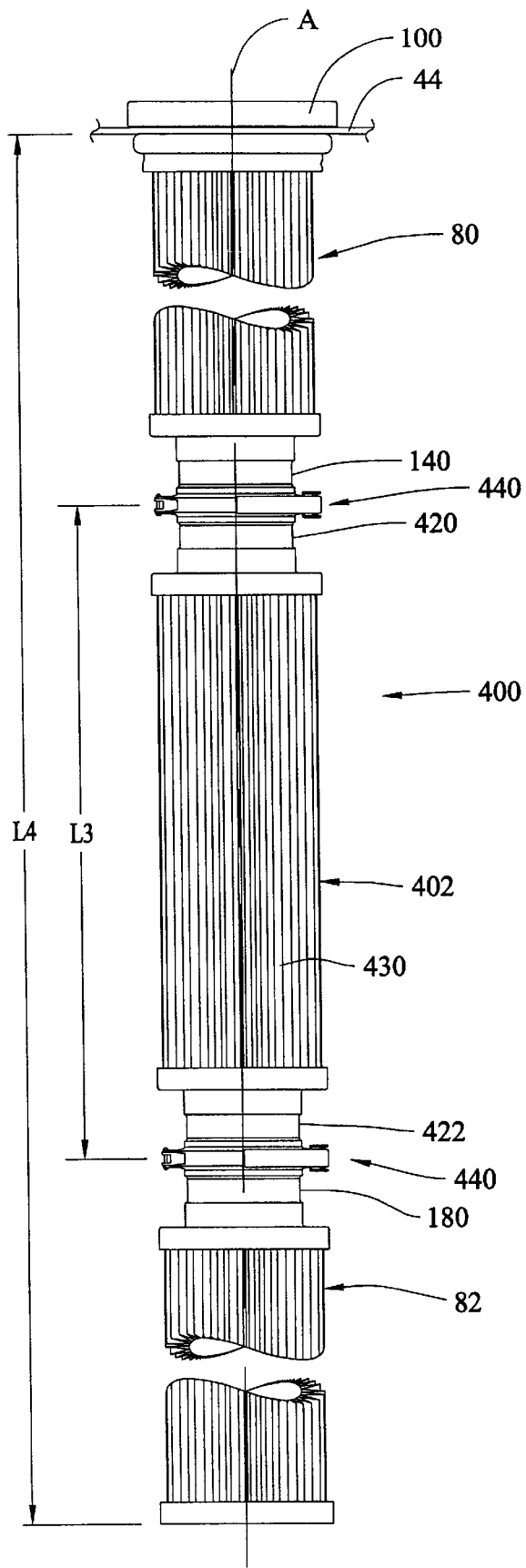
FIG. 11 is a view similar to FIG. 2 of a filter assembly having an additional filter portion according, to another embodiment of the present invention.

A filter assembly 400 (FIG. 11) with a slightly different structure may optionally include a third filter portion 402 which has a length L3. The filter assembly 400 includes the upper filter portion 80, as illustrated in FIGS. 2–3 and described above. The filter assembly 400 also includes the lower filter portion 82, as illustrated in FIGS. 2–3 and described above. The third filter portion 402 is located between and connected to the upper filter portion 80 and the lower filter portion 82 to provide flexibility in establishing a length L4 of the filter assembly 400.

The third filter portion 402 has collars 420, 422 located at opposite ends which define open ends for fluid to flow through. The collars 420, 422 are identical to the collars 140, 180 illustrated in FIG. 3 and described above. A tube (not shown) in the filter portion 402 supports a pleated filter element 430 as described above for the filter portions 80, 82. The tube 402 is fixed at opposite ends to the collars 420, 422. The tube and collars 420, 422 are connected together in a suitable manner, such as by welds, rivets, fasteners or metal deformation. Thus, a relatively strong connection and structure exists that is capable of supporting the operational weight of filter portions located below (as viewed in FIG. 11) the filter portion 402.

A pair of connection devices 440 are located at the opposite ends of the third filter portion 402. Each connection device 440 scalingly connects a collar 140 or 180 of a respective filter portion 80 or 82 with a collar 420 or 422 of an axially adjacent filter portion 402 to permit fluid communication among the connected filter portions 80, 82, 402. Each connection device 440 may be of the structure and function of the connection devices 200, 240 or 260, illustrated in FIGS. 2–8 and described above.

Each of the connection devices 440 has a size capable of fitting through the effective size D1 of the opening 46 of the tubesheet 44 and the band 66. Each connection device 440 has a strength sufficient to support the operational weight of filter portions located below the connection device, as viewed in FIG. 11. It will be apparent that any number of third filter portions 402 may be used and located between the first and lower filter portions 80, 82 to provide a filter assembly 400 of the desired overall length L4. It will also be apparent that the filter assembly 400 may have connection devices with a structure of the threaded connection device 300, illustrated in FIG. 10 and described above.

Figure 12:
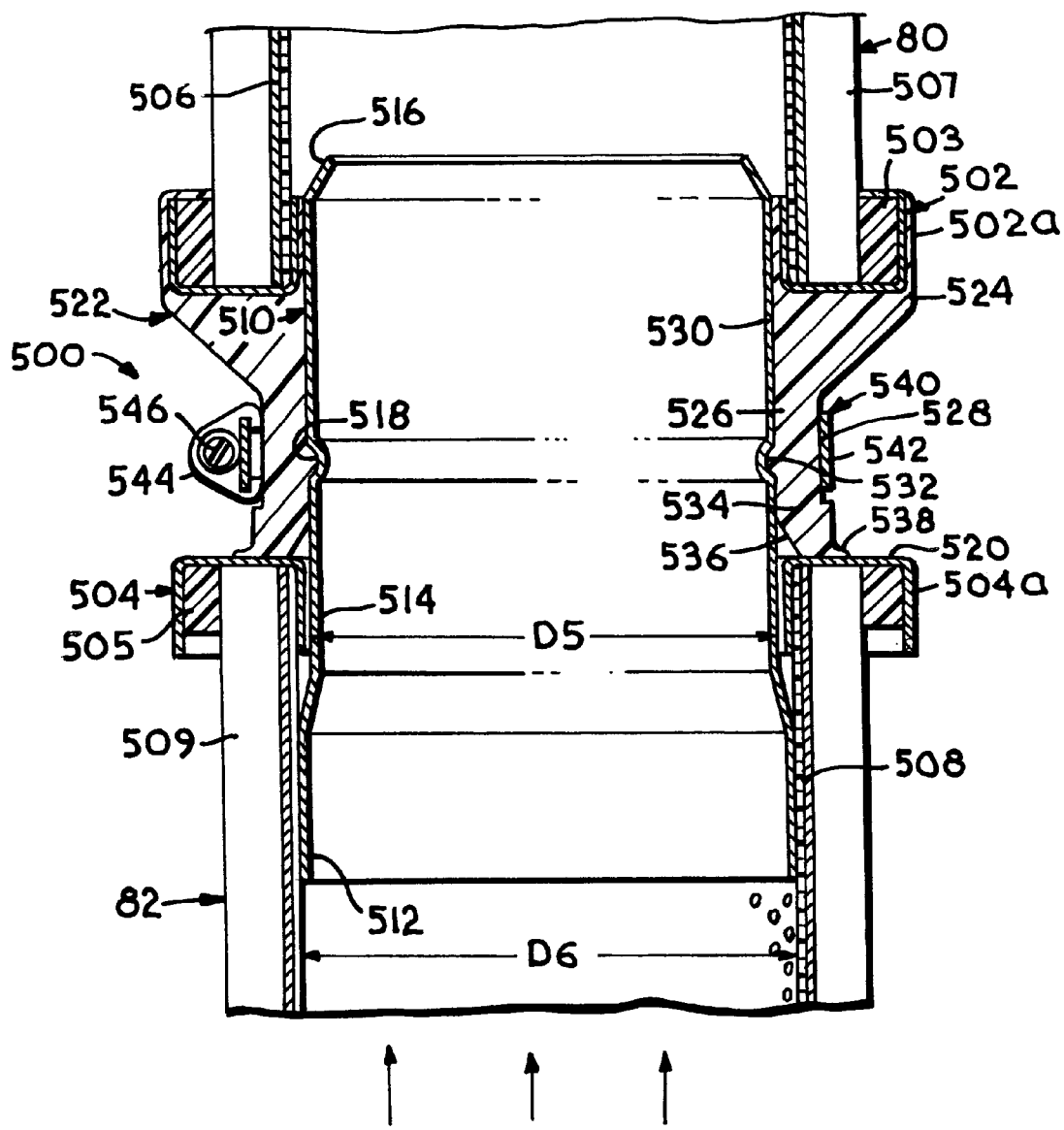
FIG. 12 is a sectional view of an alternate connection device.

FIG. 12 illustrates another alternative connection device 500. Again, the filter portions 80, 82 of the filter assembly are constructed similarly to the filter portions illustrated in FIGS. 1–3 and described above. Collars 502, 504 are fixed to tube 506 of filter portion 80 and tube 508 of filter portion 82, respectively. The tubes 506, 508 are preferably made from a metallic mesh screen. The collars 502, 504 are secured to the tubes 506, 508 in any of a number of suitable manners such as by welds, rivets, fasteners or metal deformation. Each collar 502, 504 has an outer wall 502a, 504a spaced sectionally from its corresponding pleated elements 507, 509. Potting material as indicated by reference numerals 503, 505, is filled within the space between the outerwall 502a and pleated element 507, as well as between the outerwalls 504a and pleated element 509.

A connection tube 510 is mounted telescopically within tube 508. Connection tube 510 has a bell portion 512, a cylindrical body 514 and a tapered end 516. The connection tube 510 is preferably made from steel. The connection tube 510 is secured to the interior of tube 508 at bell portion 512 such as by spot welding. An inwardly tapered portion 513 provides a transition between bell portion 512 and cylindrical body 514. The cylindrical body 514 has an outer diameter D5 that is slightly smaller than the inner diameter D6 of tube 508. An annular groove 518 is located in the connection tube 510. The groove 518 has a generally arcuate profile and is preferably located in relatively close proximity to the upper surface 520 of collar 504. At the terminal end of connection tube 510, the diameter of the tube decreases at tapered end 516. The tapered end 516 may have a constant taper or may be slightly rounded.

A flexible, integrally formed connection sleeve 522 is formed over collar 502 of tube 506. An upper portion 524 of sleeve 522 extends completely about the collar 502 and potting compound 503. The connection sleeve 522 also forms between the pleats of the pleated element 507 at its interface with the collar 502 and potting compound 503. Upper portion 524 of connection sleeve 522 tapers inwardly to neck portion 526. The outer surface 528 of neck portion 526 is generally cylindrical and smooth. The inner surface 530 of the connection sleeve 522 is also generally smooth and cylindrical except at a tongue 532 positioned within neck section 526. Tongue 532 has a shape corresponding to the profile of the annular groove 518 of connection tube 510. Flexible connection sleeve 522 terminates in an end portion 534 having an inner surface 536 angled outwardly with respect to inner surface 530. End portion 534 has a deformable rim 538. Flexible connection sleeve 522 is preferably molded from a high temperature silicon or formed by a premolded EPDM rubber material and secured to collar 502. However, the sleeve may be formed from a variety of other suitable flexible materials. For instance, in low temperature environments, the connection sleeve could be formed of a resilient urethane material. In the alternative, the flexible connection sleeve 522 may be cast directly onto pleated element 507, and the collar 502 may be eliminated from the construction of tube 506.

A hose clamp 540 is located about neck portion 526 of flexible connection sleeve 522. The hose clamp 540 includes a band 542, a housing 544 and a screw 546. The band 542 has a width less than the width of neck portion 526 and a length slightly longer than the circumferential dimension of the neck portion 526. The band 542 is preferably made from a thin stainless steel strip. The band 524 is secured to the housing 544 at a first end. The unattached end of band 542 extends around the outer surface 528 of neck portion 526 and is received within housing 544. The screw 546 is tightened within housing 544 to secure the band 542 within the housing and to hold the band around the connection sleeve 522. Alternatively, a variety of other conventional connection devices may be used to hold the flexible connection sleeve 522 to the connection tube 510 (as described below).

In operation, to connect filter portion 82 to filter portion 80, connection tube 510 is moved into the opening defined by flexible connection sleeve 522 in the direction indicated by the arrows in FIG. 12. Outer diameter D5 of connection tube 510 is slightly greater than the inner diameter of flexible connection sleeve 522 at inner surface 530 prior to insertion of the connection tube 510 so that the connection sleeve 522 fits firmly onto connection tube 510 upon insertion. The tongue 532 nests into engagement with the groove 518 when the connection tube 510 reached the proper depth within flexible connection sleeve 522. The groove 518 is located at the appropriate depth so that deformable rim 538 of end section 534 contacts upper surface 520 of collar 504 when the groove 518 receives the tongue 532. Accordingly, an air tight seal is formed between the filter portions 80, 82. Once the tongue 532 is located within groove 518 and the deformable rim 538 is in contact with collar 504, the hose clamp 540 is placed about neck portion 526 of connection sleeve 522 to hold the filter portions 80 and 82 in connection with one another. Namely, when screw 546 is tightened within housing 544, the pressure applied to outer surface 528 by the band 542 of hose clamp 540 firmly maintains the tongue 532 on the inner surface 520 of the connection sleeve 522 within the groove 518 of connection tube 510. To remove the filter portion, the band 542 of hose clamp 540 is loosened from around neck portion 526 and the filter portion 82 is pulled in the direction opposite the arrows in FIG. 12.

The alternative connection device 500 provides a simple, effective device for sealingly coupling the filter portions to one another. The connection is sufficiently strong to support the operational weight of the lower filter portion 82. Notably, in the alternative, the tongue could be placed on the connection tube 510 and the flexible connection sleeve 522 could have a mating groove. Moreover, the alternate connection device 500 could be used in accordance with the other aspects of this invention such as, for instance, coupling more than two filter portions with one another.

To effect installation of the filter assembly 24 (FIGS. 1–3), a method of the present invention is followed. The method is directed to installing the relatively long filter assembly 24 in a new or existing baghouse 20. The method generally requires two people in the baghouse 20.

The method includes providing the upper filter portion 80 with the pleated element 120. The mounting sleeve 100 is located at one end and the collar 140 is located at the opposite end. Fluid may flow through both ends of the upper filter portion 80.

The method also includes providing the lower filter portion 82 with the pleated filter element 188. The collar 180 is located at a first open end through which fluid may flow. The plate 190 is located at a second end of the lower filter portion 82 to define a closed end of the lower filter portion and the filter assembly 24.

Preferably, both people are located in the clean air plenum 42 to connect together the filter portions 80, 82. The lower filter portion 82 is held by one person so it is at least partially in the clean air plenum 42 and at least partially in the dirty air plenum 40. The upper filter portion 80 is supported by the other person so it is entirely in the clean air plenum 42. The filter portions 80, 82 are aligned along the axis A and the collars 140 and 180 are brought into axial engagement. This requires that tie lower filter portion 82 is supported so it extends through the opening 46 in the tubesheet 44. A gasket may be placed between axially adjacent ends of the filter portions 80, 82. One person in the clean air chamber 42 then scalingly connects together the filter portions 80, 82.

The collar 140 (FIG. 3) of the upper filter portion 80 is connected together with the collar 180 of the lower filter portion 82 by a connection device 200, 240 or 260. The connection device 200, 240 or 260 has sufficient strength to support the weight of filter portions located below the connection device. The filter assembly 24 and connection device 200, 240 or 260 is then moved through the opening 46 in the tubesheet 44 and the band 66. It will also be apparent that the connection device could have the structure of the connection device 300, illustrated in FIG. 10 and described above. Use of the connection device 300 requires that one filter portion 80 or 82 is rotated in an advancing direction about the axis A relative to the other filter portion 82 or 80 when the threaded portion 322 of the collar 320 is in threaded engagement with the threaded portion 304 of the collar 302.

The connecting together step may further include the step of providing a filter assembly 24 having a length L greater than the height H2 of the clean air plenum 42 when the upper and lower filter portions 80, 82 are connected together. The mounting sleeve 100 of the upper filter portion 80 is then fixed to the tubesheet 44 of the baghouse 20 to support the filter assembly 24. It will be apparent that the filter portions 80, 82 could be connected together in the dirty air plenum 40 which would not require that the connection device have a size less than the size D1 of the opening 46 in the tubesheet 44 and band 66.

From the above description of preferred embodiments of the invention, those skilled in the ail will perceive improvements, changes and modifications. Such improvements, chances and modifications within the skill of the art are intended to be covered by the appended claims.

Having described at least one preferred embodiment of the invention, what is claimed is:

1. A filter assembly for use in a baghouse and adapted to hang in a substantially vertical direction, the baghouse divided into first and second plenums by a substantially planar tubesheet portion with a plurality of openings, the first plenum having a first dimension taken normal to the planar portion of the tubesheet, the second plenum having a second dimension taken normal to the planar portion of the tubesheet and being greater than the first dimension, said filter assembly comprising:

a first filter portion including a first attachment at a first end adapted to mount to the tubesheet adjacent an opening through the tubesheet to support at least a portion of said first filter portion in the second plenum and to permit fluid communication from said first filter portion with the first plenum, a tubular member fixed to and extending from said first attachment, a pleated filter element disposed adjacent to said tubular member for support, and a second attachment fixed to said tubular member at a second end of said first filter portion, said second attachment defining an opening through which fluid may flow, said tubular member fixed to said first and second attachments with a strength sufficient to support the weight of at least one other filter portion;

a second filter portion including a third attachment at a first end and which said third attachment defines an opening through which fluid may flow, a tubular member fixed to and extending from said third attachment, a pleated filter element disposed adjacent to said tubular member for support, and a plate at a second end of said second filter portion to define a closed end of said second filter portion; and a connection device to sealingly connect said second attachment of said first filter portion with said third attachment of said second filter portion to permit fluid communication between said first and second filter portions, said connection device having a strength sufficient to support the weight of at least one filter portion located on the side of said connection device opposite the first attachment of said first filter portion wherein said second attachment of said first filter portion comprises a flexible annular sleeve and said third attachment of said second filter portion comprises a rigid connection tube wherein said rigid connection tube is received with said flexible annular sleeve to connect said first and second filter portions.

2. The filter assembly of claim 1, wherein said connection device comprises a tongue and groove arrangement for releasably securing said flexible annular sleeve with said rigid connection tube.

3. The filter assembly of claim 1, wherein said flexible annular sleeve comprises a tongue and wherein said rigid connection tube comprises a groove.

4. The filter assembly of claim 3, wherein said flexible annular sleeve further comprises a lower rim, said lower rim forming an air tight seal with said third attachment when said tongue is engaged with said groove.

5. The filter assembly of claim 1 wherein said annular connection sleeve is formed of rubber.

6. The filter assembly of claim 5 wherein said rigid connection tube is formed of steel.

7. The filter assembly of claim 1 wherein the connection device further comprises a hose clamp, said hose clamp having a band secured about said flexible annular sleeve to maintain said rigid connection tube within said flexible annular sleeve.

8. A filter assembly for use in a baghouse and adapted to hang in a substantially vertical direction, the baghouse divided into first and second plenums by a substantially planar tubesheet portion with a plurality of openings, the first plenum having a first dimension taken normal to the planar portion of the tubesheet, the second plenum having a second dimension taken normal to the planar portion of the tubesheet and being greater than the first dimension, said filter assembly comprising:

a first filter portion including a first attachment at a first end adapted to mount to the tubesheet adjacent an opening through the tubesheet to support at least a portion of said first filter portion in the second plenum and to permit fluid communication from said first filter portion with the first plenum, a tubular member fixed to and extending from said first attachment, a pleated filter element disposed adjacent to said tubular member for support, and a second attachment fixed to said tubular member at a second end of said first filter portion, said second attachment defining an opening through which fluid may flow, said tubular member fixed to said first and second attachments with a strength sufficient to support the weight of at least one other filter portion;

a second filter portion including a third attachment at a first end and which said third attachment defines an opening through which fluid may flow, a tubular member fixed to and extending from said third attachment, a pleated filter element disposed adjacent to said tubular member for support, and a plate at a second end of said second filter portion to define a closed end of said second filter portion;

a connection device to sealingly connect said second attachment of said first filter portion with said third attachment of said second filter portion to permit fluid communication between said first and second filter portions, said connection device having a strength sufficient to support the weight of at least one filter portion located on the side of said connection device opposite the first attachment of said first filter portion;

wherein said second attachment comprises a first collar and a flexible annular sleeve, said first collar fixed to said tubular member of said first filter portion and extending around said pleated filter clement of said first filter portion, said flexible annular sleeve comprising an upper portion secured about said first collar, a neck portion extending from said upper portion and a deformable rim, said flexible annular sleeve defining an inner surface having a tongue formed thereon;

wherein said third connection comprises a second collar and a rigid connection tube, said second collar fixed to said tubular member of said second filter portion and extending around said pleated filter element of said second filter portion to define a collar opening, said connection tube rigidly secured to said tubular member of said second filter portion and extending through said collar opening, said rigid connection tube having a groove complementary in shape to said tongue of said flexible annular sleeve wherein said tongue is seated within said groove and said deformable rim engages said second collar when said rigid connection tube is inserted in said flexible annular sleeve.

9. The filter assembly of claim 7 wherein said annular connection sleeve is formed of rubber.

10. The filter assembly of claim 7 wherein said rigid connection tube is formed of steel.

11. The filter assembly of claim 8 wherein the connection device further comprises a hose clamp, said hose clamp having a band secured about said flexible annular sleeve to maintain said rigid connection tube within said flexible annular sleeve.

* * * * *